United States Patent Office 3,446,279
Patented May 27, 1969

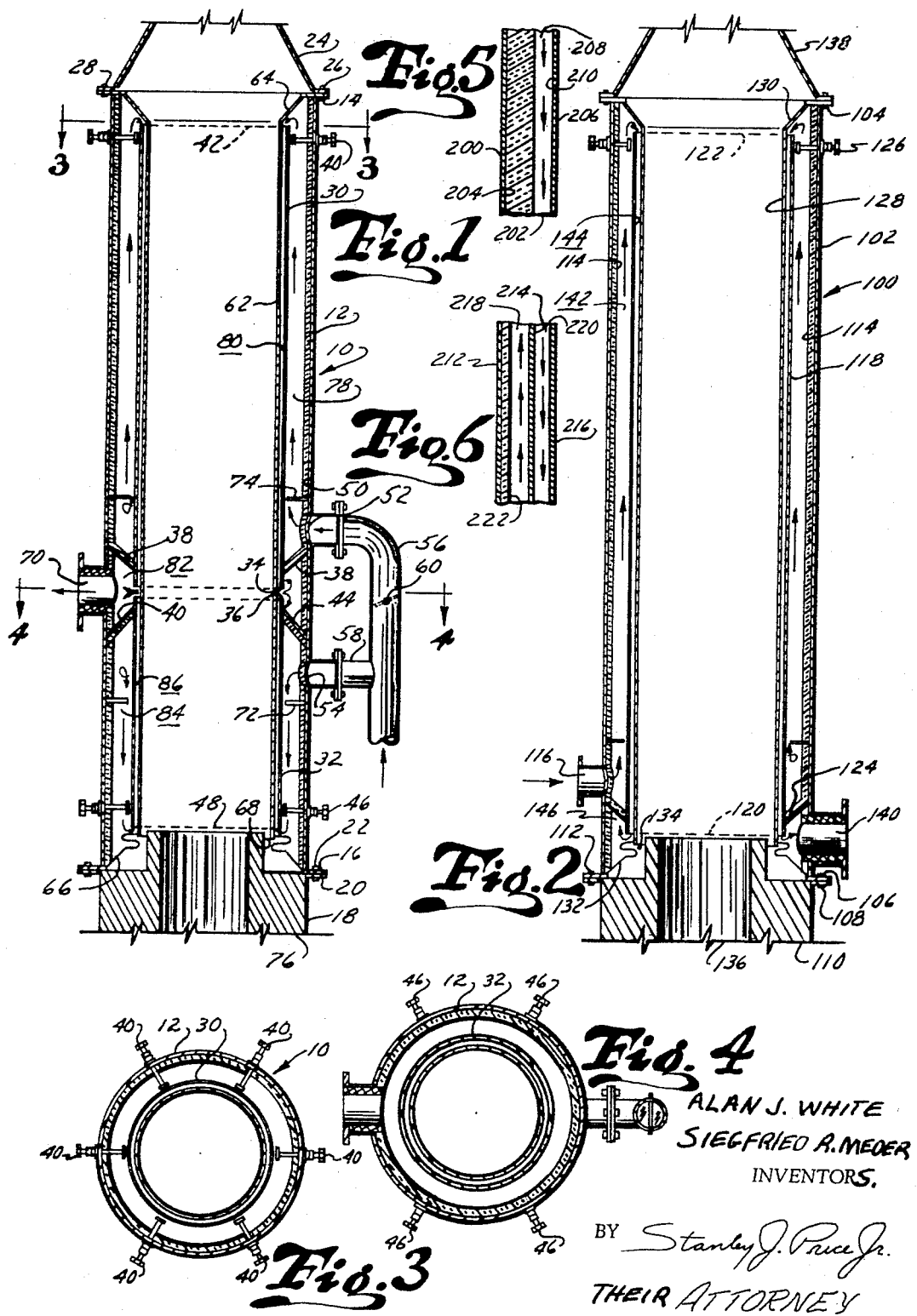

3,446,279
AIR-COOLED RADIATION RECUPERATOR
Alan J. White and Siegfried R. Meder, Pittsburgh, Pa., assignors to The American Schack Company, Inc., Pittsburgh, Pa., a corporation of Delaware
Filed July 5, 1967, Ser. No. 651,301
Int. Cl. F28d 7/10; F23l 15/04
U.S. Cl. 165—155   7 Claims

ABSTRACT OF THE DISCLOSURE

A radiation recuperator or heat exchanger having an outer cylindrical shell, an inner cylindrical shell and an intermediate shell concentric with the inner and outer shells. The outer cylindrical shell has a lining of insulating material secured to the inner surface and forms a first or outer annular passageway between the insulated inner surface of the outer shell and the exterior surface of the intermediate shell. The concentric intermediate shell is spaced from the exterior surface of the inner shell and forms a second or inner annular passageway between the exterior surface of the inner shell and the inner surface of the intermediate shell. The inner shell has suitable outwardly flanged end portions that enclose the annular passageway between the exterior surface of the inner shell and the interior surface of the outer shell. An inlet opening is provided into the outer annular passageway between the outer shell and the intermediate shell and an outlet opening is provided for the inner annular passageway between the inner shell and the intermediate shell. Flue gas at elevated temperature flows through the inner shell and transfers heat to the shells of the recuperator and the gas flowing through the annular passageways. Air, at ambient temperature, enters the outer annular passageway between the outer shell and the intermediate shell and flows through the outer passageway in one direction where the air is heated by radiation and convection. The heated air then flows through the inner annular passageway where it is further heated by radiation and convection. The heated air leaves the inner annular passageway of the recuperator through the outlet opening. In one embodiment, the inlet opening and outlet opening are positioned adjacent the base of the recuperator and in another embodiment a pair of inlet openings are provided for flow in both directions through the outer annular passageway and inner annular passageway to a single outlet opening.

BACKGROUND OF THE INVENTION

Field of the invention

This invention relates to a radiation recuperator which includes a pair of concentric counterflow passageways for the flow of fluid therethrough. More particularly, this invention relates to a radiation recuperator wherein the fluid to be heated first passes through an outer annular passageway adjacent the inner surface of the external shell and thereafter through an inner annular passageway adjacent the exterior surface of the inner shell.

Scope of the invention

Radiation recuperators in use at the present time generally comprise an exterior cylindrical shell and an inner cylindrical shell. The hot flue gas passes upwardly through the annular passageway between the inner and outer shell. The recuperators are designed to operate in counterflow, where the air flows in an opposite direction to the flue gas, and in parallel flow where the air flows in the same direction as the flue gas. There are also recuperators where a part of the air flows in the same direction as the flue gas and the remainder of the air flows in a direction opposite to the flue gas. This latter arrangement is disclosed in U.S. Patent 2,917,285. In order to prevent excessive heat loss through the outer shell of the recuperator, it is necessary to insulate the outer shell. It has been proposed in the past to provide external insulation for the outer shell where blocks or other forms of insulation are fastened around the external surface of the outer shell. With this type of insulation, it has been found necessary to provide an external structure to support and suspend the recuperator because the concentric shells of the recuperator are subjected to both a heat and thermal expansion. With the external insulation, it has been found impractical to design a self-supporting recuperator without external supporting structure.

In other types of recuperators the inner surface of the outer shell is lined with a refractory or insulating material and the air to be heated passes through the annular passageway between the external surface of the inner radiation shell and the inner surface of the refractory material. With this arrangement, the outer metallic shell, being insulated from the high temperature gas by the refractory, is used as the structural support member since expansion of the outer shell is maintained at a minimum by the refractory lining. It has been found, however, that the refractory has to be of substantial thickness to prevent the external metallic shell from being subjected to the high temperatures of the flue gas. With the known recuperators, as disclosed in U.S. Patents 2,742,269 and 2,998,962, it is also necessary to provide conduits of substantial length to convey the cold air to the cold air inlet means for both counterflow and parallel flow arrangements.

SUMMARY OF THE INVENTION

The herein disclosed invention relates to a self-insulating radiation recuperator that has an inner cylindrical shell, an intermediate cylindrical shell, and an outer cylindrical shell forming a first or outer annular passageway between the outer and intermediate shell and a second or inner annular passageway between the intermediate and inner shell. An inlet opening is provided into the first annular passageway and an outlet opening is provided from the inner annular passageway. The hot flue gases flow upwardly through the inner shell and the air to be heated flows first through the outer annular passageway and thereafter through the inner annular passageway. With this arrangement, the air entering the first or outer annular passageway absorbs heat from the inner refractory surface of the outer shell and the outer surface of the intermediate shell. Thereafter, the heated air flows through the second or inner annular passageway and absorbs heat from the outer surface of the inner shell and the inner surface of the intermediate shell. The cross sectional area of the inner annular passageway is smaller than the cross sectional area of the outer passageway so that the velocity of the air is increased in the second annular passageway for more efficient heat transfer. With this arrangement, the heat transfer efficiency is increased and the size of the recuperator can be reduced. Also, the air flowing through the outer annular passageway at a relatively low velocity insulates the outer shell so that the thickness of the refractory lining can be reduced substantially.

Accordingly, the principal object of this invention is to provide an air-cooled radiation recuperator wherein the amount of refractory lining for the outer shell is reduced substantially.

Another object of this invention is to improve the efficiency of the radiation recuperator by first heating the air in an outer annular passageway and thereafter conveying the partially heated air through a second annular passageway adjacent the inner shell.

Another object of this invention is to provide a radiation recuperator wherein the air to be heated in the recuperator insulates the inner surface of the outer cylindrical shell.

These and other objects and advantages of this invention will be more completely disclosed and described in the following specification, the accompanying drawings and the appended claims.

BRIEF DESCRIPTION OF THE DRAWINGS

In the drawings:

FIGURE 1 is a view in vertical section of one embodiment of the improved radiation recuperator wherein there is provided a split feed for the air.

FIGURE 2 is a view in section of another embodiment of the improved recuperator with the air inlets and outlets positioned adjacent the base of the recuperator.

FIGURE 3 is a view in section taken along the line 3—3 of FIGURE 1 illustrating the concentric arrangement of the shells and the relative cross sectional areas of the outer and inner passageways.

FIGURE 4 is a view in section taken along the line 4—4 in FIGURE 1 further illustrating the concentric arrangement of the shells.

FIGURE 5 is a fragmentary view in vertical section of the inner and outer shells of a conventional recuperator with a relatively thick refractory lining therebetween.

FIGURE 6 is an enlarged view in vertical section of a portion of the inner, intermediate and outer shells illustrated in FIGURES 1 and 2 and illustrating the reduced refractory requirements with the inner and outer passageways for air flow.

DESCRIPTION OF THE PREFERRED EMBODIMENTS

Referring to FIGURES 1, 3 and 4 there is illustrated an improved split feed recuperator generally designated by the numeral 10 that has an outer cylindrical shell 12 with a top flanged portion 14 and a bottom outwardly flanged portion 16. A conventional stack 18 has an annular flanged portion 20 on which the flanged portion 16 of outer shell 12 is positioned and secured thereto by bolts 22. A converging exhaust stack 24 has an outwardly flanged portion 26 positioned in overlying relation with the flanged top portion 14 of the outer shell 12 and is secured thereto by bolts 28.

Positioned concentrically within the outer shell 12 is an upper intermediate shell 30 and a lower intermediate shell 32. The upper shell 30 has a lower edge portion 34 that is spaced from the upper edge portion 36 of lower shell 32. An inwardly extending annular support member 38 is secured to the inner surface of outer shell 12 and the outer surface of the upper inner shell 30 adjacent the lower edge portion 34. The inwardly extending annular support member 38 supports the upper shell 30 in a vertical position. The outer shell 12 has a plurality of adjustable stop members 40 extending radially inwardly therethrough which are spaced a preselected distance from the outer surface of the intermediate upper shell 30 adjacent the intermediate shell top edge portion 42. The adjustable stop members prevent sway of the intermediate upper shell and permit relative movement thereof due to expansion and contraction of the intermediate upper shell.

There is a second inwardly extending annular support member 44 secured to the outer shell 12 and to the lower intermediate shell 32 adjacent the top edge portion 36 and serves to support the intermediate shell 32. There are similar adjustable stops 46 extending through the outer shell 12 adjacent the lower edge 48 of the lower intermediate shell 32 to prevent sway of the lower portion of the intermediate shell 32 while permitting expansion and contraction thereof.

There is a relatively thin lining of ceramic insulation 50 secured to the inner surface of the outer shell 12 and to the inner surface of the inturned flanges 38 and 44. An inlet opening 52 is provided in the outer shell 12 above the annular support member 38 and a second inlet opening 54 is provided below the other annular support member 44. Conduit 56 is connected at one end to inlet opening 52 and has an intermediate branch conduit 58 connected to inlet opening 54. A balancing valve 60 is positioned in conduit 56 to control the amount of air flowing into inlet openings 52 and 54.

Positioned concentrically within the intermediate shell 30 is an inner shell 62 that has a flanged upper edge portion 64 secured to the upper flange 14 of outer shell 12. The inner shell 62 is thus supported by and suspended from the outer shell 12 at the connection between the inner and outer shells at the flanged portion 14 and is suspended concentrically within the intermediate shell 30. A flexible annular expansion member 66 is connected to the lower edge 68 of the inner shell 62 and to the bottom flange 16 of the outer shell 12. With this arrangement, the inner shell 62 is free to expand and contract longitudinally relative to the intermediate shell 30 and the outer shell 12. The outer shell 12 has an outlet opening 70 between the annular support members 38 and 40. Suitable air distribution rings 72 and 74 extend radially inwardly from the outer shell 12 adjacent the inlet openings to evenly distribute the air around the annular passageway between the intermediate and outer shells.

The stack 18 has a central opening 76 through which hot flue gas flows into and through the inner shell 62 and transfers heat thereto as it passes upwardly and exhausts through the converging exhaust stack 24. A first annular or outer passageway 78 is formed between the refractory lining 50 on the inner surface of shell 12 and the outer surface of the intermediate shell 30. A second or inner annular passageway 80 is formed between the inner surface of the intermediate shell 30 and the outer surface of the inner shell 62. Inner shell upper flanged portion 64 forms a closure for the outer passageway 78 and connects the outer passageway 78 with the inner passageway 80 adjacent the recuperator top portion. The annular support members 38 and 44 form a chamber 82 between the intermediate and outer shells 12 and 30 that is connected to the second passageway 80 adjacent the intermediate shell lower edge portion 34. Thus, air entering through inlet opening 52 flows through the outer annular passageway 78 upwardly and is deflected by the upper flanged portion of the inner shell 64 into the inner passageway 80 between the inner and intermediate shells 62 and 30 respectively. The air flows downwardly through the second passageway into the chamber 82 and exits from the chamber 82 through the outlet opening 70. A second outer annular passageway 84 is formed between the lower poriton of the outer shell 12 and the lower intermediate shell 32, and second inner annular passageway 86 is formed between the lower intermediate shell 32 and the inner shell 62. With this arrangement, air entering through the inlet opening 54 flows downwardly through the outer annular passageway 84 and upwardly through the intermediate passageway 86 into the chamber 82 and outwardly through the outlet opening 70.

In FIGURE 2, there is illustrated another embodiment of the invention in which the recuperator designated by the numeral 100 that has a single inlet opening and a single outlet opening. The recuperator 100 has an outlet cylindrical shell 102 with a top flanged portion 104 and a bottom flanged portion 106. The bottom flanged portion 106 is connected to an annular flange 108 of a conventional stack 110 by means of bolts 112 to secure the recuperator 100 thereto. The outer shell 102 has an inner refractory lining 114 and an inlet opening 116 adjacent the outer shell lower portion. An intermediate shell 118 is positioned concentrically within the outer shell 102 and has a lower edge portion 120 and an annular upper edge portion 122. An inturned annular supporting member 124 is secured to the inner surface of the outer shell 102 and the outer surface of the intermediate shell 118 adjacent the lower edge portion 120 and supports the intermediate shell 118 in a vertical concentric position within the outer shell 102. A plurality of adjustable stops 126 extend radially inwardly through the outer shell 102 adjacent the intermediate shell top edge 122 and are arranged to prevent the sway of the intermediate shell 118. An inner shell 128 is positioned concentrically within the intermediate shell 118 and has an outwardly flanged top edge 130 which is secured to the flange 104 of outer shell 102 so that the inner shell 128 is supported by the outer shell 102. A flexible expansion member 132 is secured to the lower edge 134 of the inner shell 128 and to the lower flanged portion 106 of outer shell 102. The flanged member 132 forms a seal for the flue gas. With this arrangement, the flue gas flows through stack outlet 136 and through the inner seal 128 and exhausts through the converging exhaust stack 138 secured to the outer shell upper flange 104. The outer shell 102 has an outlet opening 140 adjacent the base of the recuperator 100 below the annular support member 124.

An outer or first annular passageway 142 is formed between the installation liner 114 on the outer shell 102 and a second or inner passageway 144 is formed between the intermediate and inner shells 118 and 128. The inlet opening 116 in outer shell 102 is connected to the outer or intermediate passageway 142 so that air entering through inlet opening 116 flows upwardly through the outer passageway 142 toward the top portion of recuperator 100. The radially extending flange 130 on the inner shell 128 forms a closure for the outer passageway 142 so that the air flowing upwardly therethrough is deflected downwardly through the inner or second passageway 144. The air flows downwardly through inner passageway 144 to a chamber 146 formed by the inturned flange 124 and the flexible annular expansion member 132. The heated air exists from the chamber 146 through the outlet opening 140.

FIGURE 5 is a fragmentary view in section illustrating a conventional shell arrangement for a recuperator where the outer shell designated by the numeral 200 has a relatively thick refractory or ceramic type insulation 202 secured to the outer shell inner surface 204. In conventional recuperators the thickness of the refractory insulation ranges from 3 to 4½ inches. The inner shell 206 is positioned concentrically within the outer shell 200 and forms an annular passageway 208 between the exterior surface 210 of inner shell 206 and the refractory lining 202.

As is illustrated in FIGURE 6, the improved recuperators previously described in this specification have an outer shell 212, an intermediate shell 214 and an inner shell 216 forming an outer passageway 218 and an inner annular passageway 220. Because of the improved operating efficiency of the hereinbefore described recuperators, the refractory insulation 222 lining the inner wall of the outer shell 212 is relatively thin. It has been found, for example, that the refractory insulation of about 1 inch adequately insulates the outer shell 212.

OPERATION

In conventional recuperators as illustrated in FIGURE 5, the hot flue gases at a temperature of about 1000° C. radiates heat to the inner shell 206 by infra-red radiation. The air to be heated passes through the passageway 208 which is relatively narrow at a relatively high velocity. The air to be heated wipes the outer surface 210 of the inner shell 206 and absorbs heat therefrom. In FIGURE 5 the inner shell 206 radiates heat to the refractory insulation 202. The air to be heated flowing through the passageway 208 wipes the inner surface of the insulation 202 and absorbs the heat therefrom.

In the improved recuperator hereinbefore described, the air to be heated first flows through passageway 218 and wipes the exterior surface of the intermediate shell 214 and the interior surface of the refractory 222 and absorbs heat therefrom. The air to be heated thereafter flows through the inner passageway 220 and wipes the exterior surface of the inner shell 216 and the inner surface of the intermediate shell 214. Thus the intermediate shell has both surfaces wiped by the flowing air to absorb heat therefrom. This results in both the intermediate shell 214 and the outer shell 212 being cooler than the conventional design.

The intermediate shell 214 is heated by radiation from the inner shell 216 and a greater amount of heat is transferred from the inner shell to the outer shell because heat transfer by radiation is dependent on the $T^4$ relationship. Heat transfer by radiation from the flue gas to the inner shell is dependent on the temperature of the gas and the temperature of the inner shell. This may be expressed in the following manner $T_G^4 - T_W^4$, where $T_G$ is the temperature of the gas and $T_W$ is the temperature of the inner shell. The lower the temperature of the inner shell, the higher will be the amount of heat transferred from the flue gas to the shell wall.

Comparative wall temperatures of the conventional design and our improved recuperator is set forth below where $T_{W1}$ indicates the temperature of the inner shell, $T_{W2}$ indicates the temperature of the intermediate shell and $T_{W3}$ indicates the temperature of the interior surface of the insulation. These temperatures are designated in FIGURES 5 and 6.

| Shell temperatures | Conventional design, (° C.) | Improved recuperator, (° C.) |
| --- | --- | --- |
| Inner shell, $T_w^1$ | 475 | 465 |
| Intermediate shell, $T_w^2$ | 325 | 270 |
| Hot face of insulation, $T_w^3$ | 325 | 200 |

It will be apparent with the recuperators described herein that it is now possible to reduce the surface area of the primary heating surface, i.e. the inner shell of the recuperator, by about 10 percent when compared with the conventional design and obtain the same amount of heat transfer.

Substantial savings are made in reducing the size of the recuperator to perform the same mass heat transfer.

The relative dimension of the outer passageway 218 and the inner passageway 220, as illustrated in FIGURE 6, is such that the annular radial dimension of the outer passageway is about 4 inches and the annular radial dimension of the inner passageway 220 is about 1 inch. This arrangement permits the air flowing in the outer passageway 218 to flow at a relatively low velocity and serve as an insulating means for the outer shell 212 as it absorbs heat by radiation from the outer surface of the intermediate shell 214 and the inner surface of the insulation 222. The velocity of the air to be heated is increased substantially, however, as the air flows through the inner passageway 220. The increase in the velocity of the air serves to increase the wiping efficiency of the air as it flows so that more heat is absorbed by the air from the exterior surface of the inner shell 216 and the interior surface of the intermediate shell 214. The increase in velocity of the air increases the amount of heat absorbed by the air and further reduces the temperature of the inner shell 216 and increases the heat transfer by radiation from the gas to the inner shell 216.

According to the provisions of the patent statutes, we have explained the principle, preferred construction, and mode of operation of our invention and have illustrated and described what we now consider to represent its best embodiment. However, we desire to have it understood that, within the scope of appended claims, the invention may be practiced otherwise than as specifically illustrated and described.

We claim:

1. In a self-insulating radiation recuperator the combination comprising, an outer cylindrical shell having an inner refractory lining, a top opening and a bottom opening, an intermediate cylindrical shell positioned concentrically in said outer cylindrical shell and forming a first annular passageway between said inner refractory lining and the exterior surface of said intermediate cylindrical shell, an inner cylindrical shell positioned concentrically within said intermediate cylindrical shell and forming a second annular passageway between said intermediate cylindrical shell inner surface and said inner cylindrical shell outer surface, said inner cylindrical shell having a top opening, a bottom opening and a passageway for the flow of a fluid therethrough at an elevated temperature.

said inner cylindrical shell having an outwardly flanged top end portion adjacent said top opening secured to said outer cylindrical shell adjacent said outer cylindrical shell top opening and connecting said first annular passageway with said second annular passageway, said flanged top end portion connecting said first axial passageway in said inner cylindrical shell with an aligned exhaust stack second axial passageway for flow of fluid from said first axial passageway through said exhaust stack second axial passageway, said outer cylindrical shell having an annular supporting member secured thereto and secured to said intermediate shell above the lower edge portion of said intermediate shell and forming a closure for said passageway, an annular chamber below said annular supporting member, said second annular passageway opening into said annular chamber, said outer shell having an inlet opening into said first annular passageway above said annular supporting member for flow of fluid first into said first annular passageway and thereafter from said first annular passageway into said second annular passageway, and said chamber having an outlet opening for the flow of fluid therefrom.

2. A radiation recuperator as set forth in claim 1 in which said inner cylindrical shell is suspended in said intermediate shell by said inner cylindrical shell outwardly flanged top end portion being secured to said outer cylindrical shell to that said inner cylindrical shell is free to move axially relative to said intermediate cylindrical shell.

3. A radiation recuperator as set forth in claim 1 in which said annular supporting member secured to said outer cylindrical shell and said intermediate cylindrical shell supports said intermediate cylindrical shell so that said intermediate cylindrical shell is free to move axially relative to said inner cylindrical shell.

4. A radiation recuperator as set forth in claim 3 which includes adjustable means extending radially inwardly through said outer cylindrical shell adjacent said intermediate cylindrical shell top portion, said adjustable means inner end portion positioned in spaced relation to said intermediate shell top portion and arranged to maintain said intermediate shell concentric with said intermediate shell concentric with said inner cylindrical shell and permit longitudinal movement of said intermediate cylindrical shell relative to said inner cylindrical shell.

5. A radiation recuperator as set forth in claim 1 in which said second annular passageway has an area in cross section smaller than the area in cross section of said first annular passageway so that the velocity of the fluid flowing from said first annular passageway into said second annular passageway is increased.

6. A radiation recuperator as set forth in claim 1 in which said annular chamber comprises said annular supporting member, an annular outwardly flanged bottom end portion on said inner cylindrical shell secured to said outer cylindrical shell below said annular supporting member, said outlet opening in said outer annular shell extending through said outer annular shell into said chamber between said annular supporting member and said outwardly flanged portion of said inner cylindrical shell.

7. A radiation recuperator as set forth in claim 1 which includes, a second intermediate cylindrical shell positioned in concentric relation with said inner cylindrical shell and axially aligned with said other intermediate cylindrical shell, the top edge of said second intermediate shell spaced from the bottom edge of said other intermediate shell and forming an outlet from second annular passageway, a second annular support member secured to said outer cylindrical shell and said second intermediate cylindrical shell adjacent said second intermediate cylindrical shell top edge portion, said inner cylindrical shell having an annular flanged end portion secured to said outer cylindrical shell below the bottom edge of said second intermediate cylindrical shell and forming a closure for a second outer annular passageway in said outer cylindrical shell and said second intermediate cylindrical shell, said first annular support member and said second annular support member positioned in spaced relation and forming a chamber therebetween, said outer cylindrical shell having an outlet opening for said chamber, said outer cylindrical shell having a second inlet opening below said second annular supporting member for flow of fluid into said outer annular passageway between said outer cylindrical shell and said second intermediate cylindrical shell and thereafter through a second inner annular passageway between said intermediate cylindrical shell and said inner cylindrical shell to said chamber.

References Cited
UNITED STATES PATENTS

| | | | |
|---|---|---|---|
| 1,478,550 | 12/1923 | Casale | 165—155 X |
| 3,189,086 | 6/1965 | Esser et al. | 165—83 |
| 3,346,042 | 10/1967 | Seehausen | 165—83 X |

FOREIGN PATENTS

| | | |
|---|---|---|
| 1,103,445 | 5/1955 | France. |

ROBERT A. O'LEARY, *Primary Examiner.*

T. W. STREULE, *Assistant Examiner.*

U.S. Cl. X.R.

263—20